W. SARTAIN.
PULLING DEVICE FOR MOTOR VEHICLES.
APPLICATION FILED APR. 20, 1916.
1,226,815. Patented May 22, 1917.
2 SHEETS—SHEET 2.
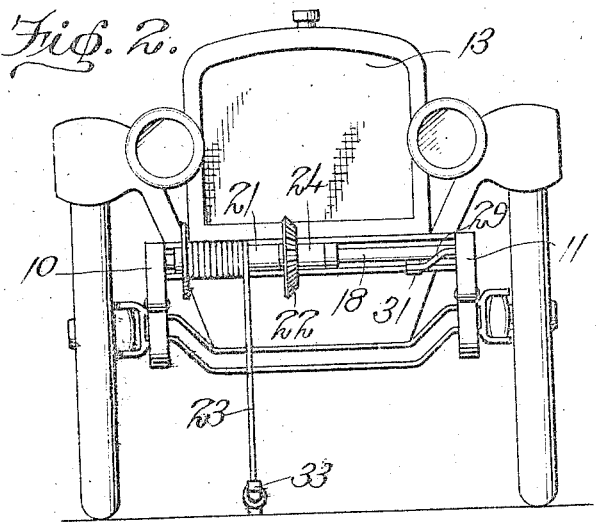
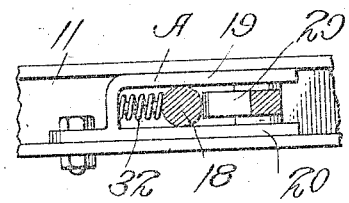
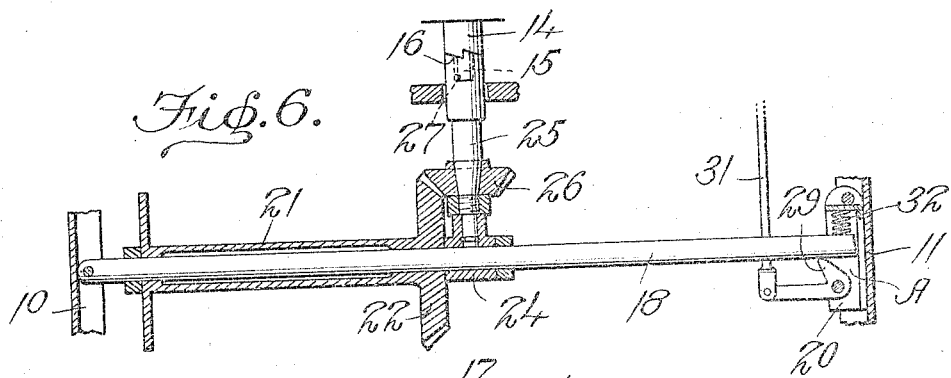
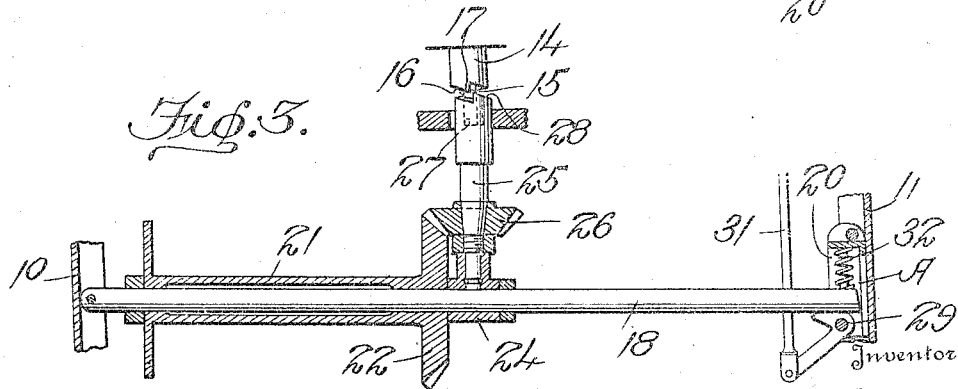
Witnesses
Inventor
W. Sartain,
By Henry T. Bright
Attorney

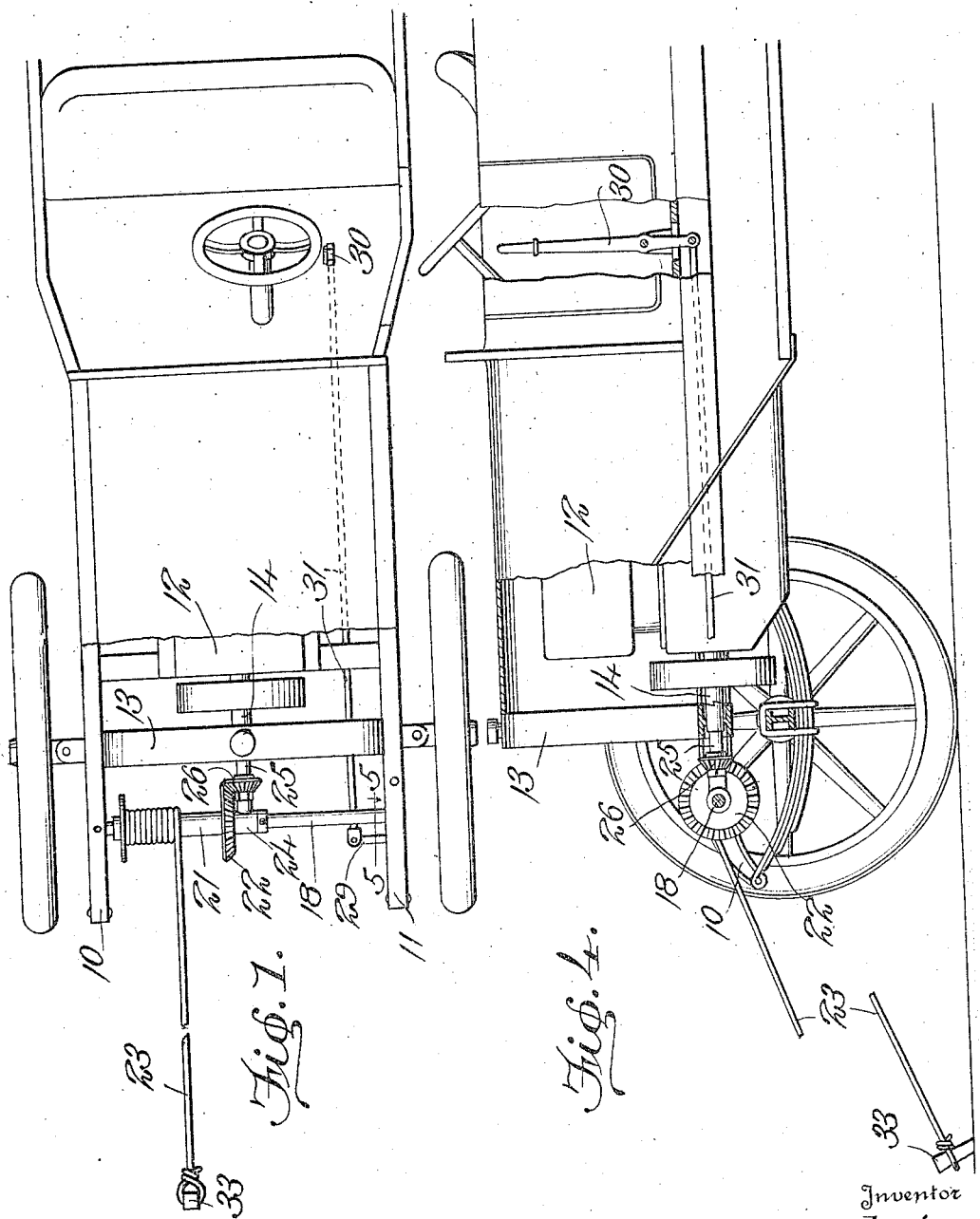

UNITED STATES PATENT OFFICE.

WILLIAM SARTAIN, OF HASKELL, OKLAHOMA.

PULLING DEVICE FOR MOTOR-VEHICLES.

1,226,815.  Specification of Letters Patent.  Patented May 22, 1917.

Application filed April 20, 1916. Serial No. 92,571.

*To all whom it may concern:*

Be it known that I, WILLIAM SARTAIN, a citizen of the United States, and resident of Haskell, in the county of Muskogee and State of Oklahoma, have invented certain new and useful Improvements in Pulling Devices for Motor-Vehicles, of which the following is a specification.

My invention relates to pulling devices for motor vehicles.

It is my purpose to provide a device of the character named which can be easily associated with a motor vehicle and when so associated can be operated at will through the power of the vehicle motor to effectively move the vehicle when same has become mired or stalled on bad roads, or disabled from any cause other than defect of the motor.

It is my further purpose to provide a device of the type referred to which will be simple in construction, efficient and powerful in operation, and which can be manufactured at a relatively small cost.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of the forward portion of a motor vehicle embodying my invention;

Fig. 2, a front view of same;

Fig. 3, a horizontal section of a fragment of what is shown in Fig. 1;

Fig. 4, a side view of what is shown in Fig. 1 with certain parts omitted for the sake of clearness;

Fig. 5, a section on the line 5—5 of Fig. 1, and

Fig. 6, a view similar to Fig. 3 with the parts operated to a position to connect same with the motor of the vehicle.

Referring to the drawings 10 and 11 indicate the side members of the vehicle frame, 12 the motor, 13 the radiator, and 14 the motor shaft. The forward end of the shaft is reduced as at 15 to form a shoulder 16 which latter is provided with teeth forming part of a clutch device to be hereinafter referred to. Pivoted to the side member 10 is one end of a bar 18. Secured to the side member 11 is a bracket A of substantially U-shaped cross section and embodying arms 19 and 20 between which the free end of the bar 18 is slidably engaged. Rotatably mounted on the bar 18 is a drum 21 one flange of which is formed by a beveled gear 22. A cable 23 is adapted to be wound upon and unwound from the drum 21. Fixed on the bar 18 is a bearing 24 in which is rotatably mounted one end of a shaft 25, the latter being disposed at right angles to the bar 18. Fixed on this shaft 25 is a beveled gear 26 which meshes with the gear 22 and whereby rotation of the shaft 25 will effect rotation of the drum 21. The shaft 25 extends rearwardly or in the direction of the motor 12 and has the end thereof adjacent the motor provided with a recess 27 which receives the reduced end 15 of the motor shaft and on which reduced end the shaft 25 is adapted to slide as the pulling device is thrown into and out of operation. The end of the shaft 25 adjacent the motor 12 is also provided with teeth 28 adapted to coöperate with the teeth 17 to lock the shaft 25 to the shaft 14 and thereby affect rotation of the drum 21 by the motor 12. Pivotally mounted on the bracket A between the arms 19 and 20 and forward of the bar 18 is a cam lever 29 adapted to coöperate with the bar 18 when moved in one direction to swing said bar and the parts carried thereby toward the motor 12 to engage the teeth 28 with the teeth 17 and thus connect the drum 21 with the motor 12 for the purpose of rotating the former. The cam lever 29 is adapted to be operated by means of a hand lever 30 pivoted on the body of the vehicle and connected to the lever 29 by means of a suitable link 31. Mounted on the bracket A between the arms 19 and 20 and bearing against the bar 18 is a spring 32 which constantly tends to hold the bar 18 in a position to dispose the teeth 28 out of engagement with the teeth 17 or in other words this spring normally holds the pulling device in inactive position.

In the operation of the device the cable 23 is attached to a suitable anchor 33 secured in the ground in advance of the motor vehicle. The lever 30 is then operated to pivot the lever 29 and the cam of the latter coacts with the bar 18 to swing the latter toward the motor 12 against the influence of the spring 22 and thereby engage the teeth 28 with the teeth 17 to connect the drum 21 with the motor. The resultant rotation of the drum 21 will wind the cable 23 thereon and move the vehicle.

While I have disclosed my invention in the best form known to me at present it will be understood that it is susceptible to improvement in forms, proportions, and details of construction and to desirable additions, by the exercise of ordinary mechanical skill and without departing from the spirit of my invention.

What is claimed is:—

1. In a pulling device for motor vehicles, the combination with the frame and motor, of a bar pivoted on the frame, a drum rotatable on the bar, a normally inactive clutch device between the drum and motor adapted to connect the drum and motor when the bar is swung in one direction, and means for swinging the bar to throw in the clutch device.

2. In a pulling device for motor vehicles, the combination with the frame and motor, of a bar pivoted to one side of the frame, a bracket secured to the other side of the frame and in which the free end of the bar is slidably engaged, a drum rotatably mounted on the bar, a shaft rotatably mounted on the bar at right angles to the latter, connections between the shaft and drum, a clutch device included in said shaft adapted to connect the latter to the motor when the bar is swung in one direction, means normally holding the bar in position to maintain the clutch device disconnected from the motor, a cam lever pivoted on the bracket and operable to swing the bar to connect the clutch device with the motor, and means for actuating the cam lever.

In testimony whereof I hereunto affix my signature in the presence of two witnesses.

WILLIAM SARTAIN.

Witnesses:
J. E. WYAND,
WILLIE M. RICHARDS.